Feb. 8, 1955  D. W. IRWIN  2,701,695
HYDRAULIC INTERLOCK FOR RETRACTIBLE LANDING GEAR
AND CLOSURE OPERATORS FOR THE CHAMBERS THEREFOR
Filed Aug. 18, 1949  2 Sheets-Sheet 1
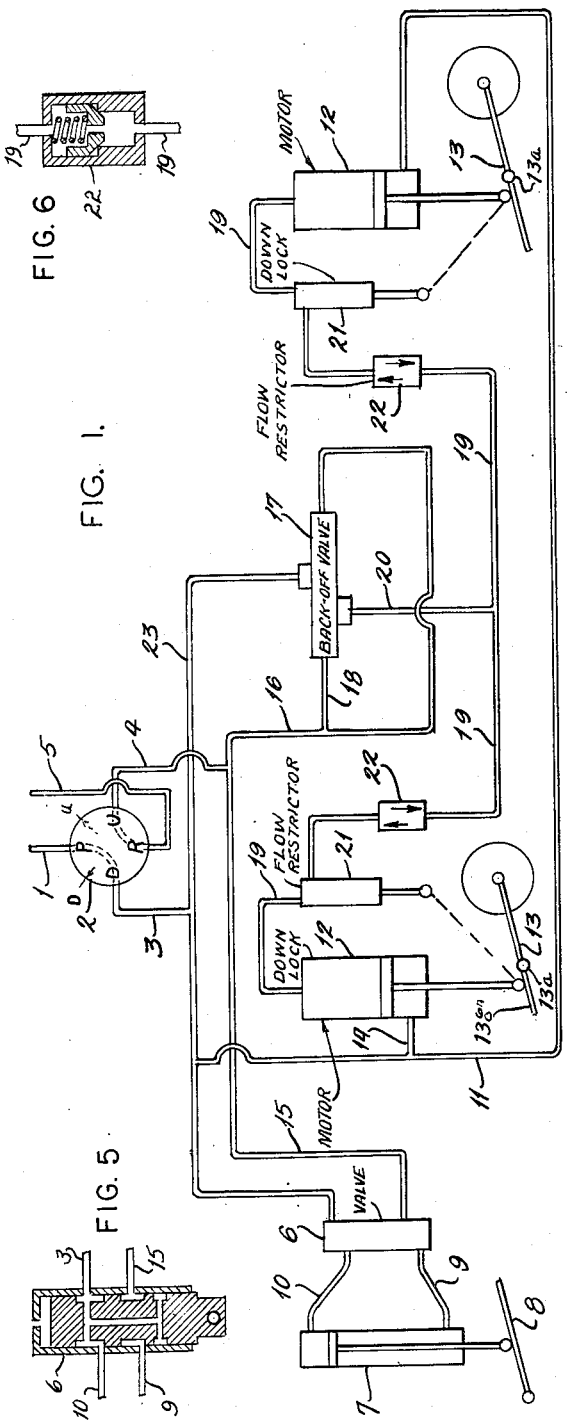
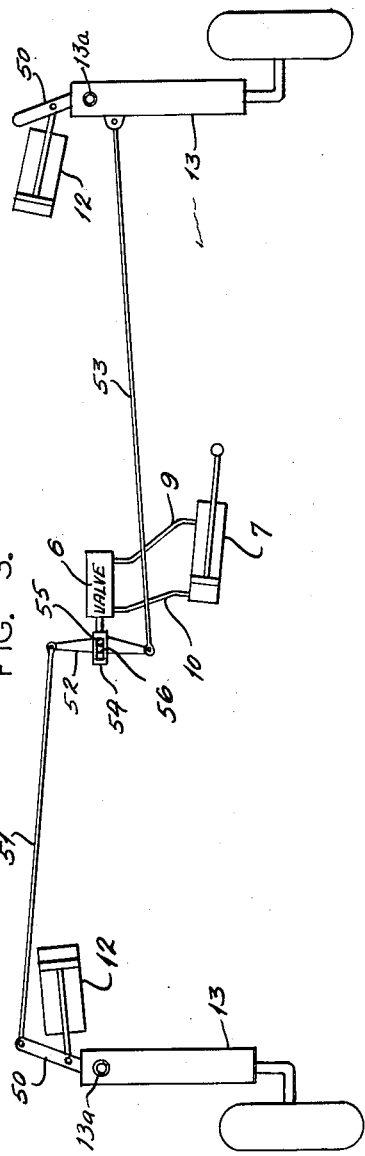
INVENTOR:
Donald W. Irwin
By Carr & Carr & Grady
HIS ATTORNEYS.

Feb. 8, 1955  D. W. IRWIN  2,701,695
HYDRAULIC INTERLOCK FOR RETRACTIBLE LANDING GEAR
AND CLOSURE OPERATORS FOR THE CHAMBERS THEREFOR
Filed Aug. 18, 1949  2 Sheets-Sheet 2
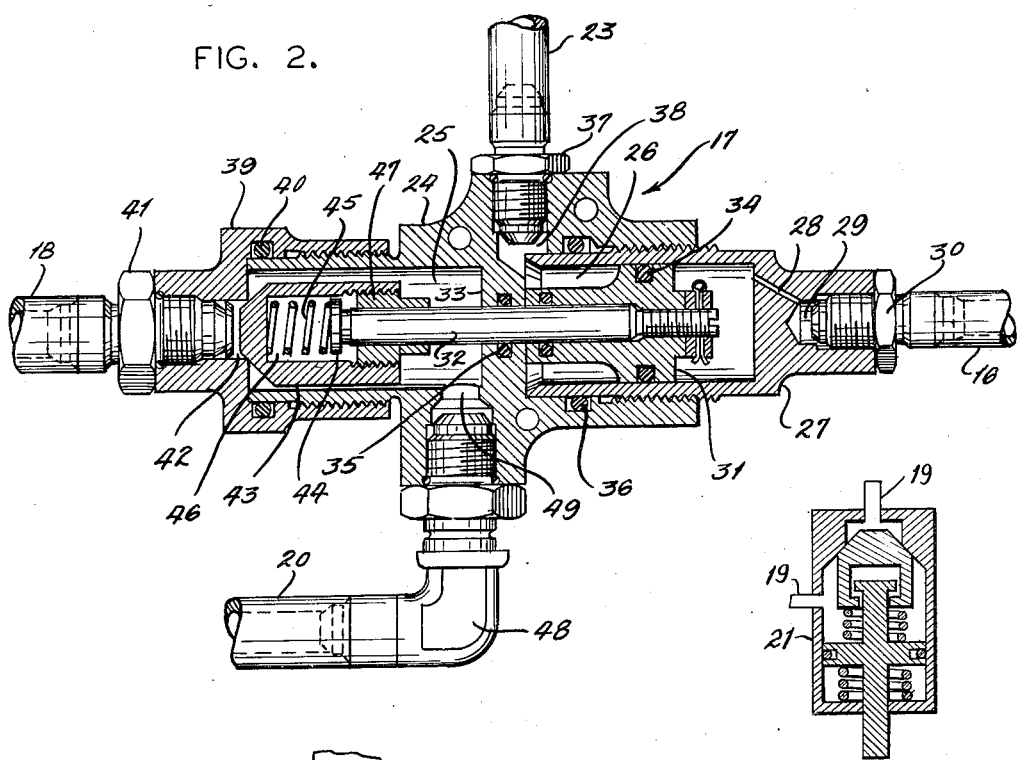
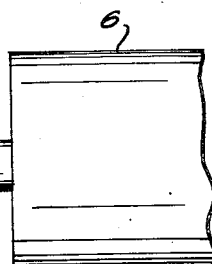
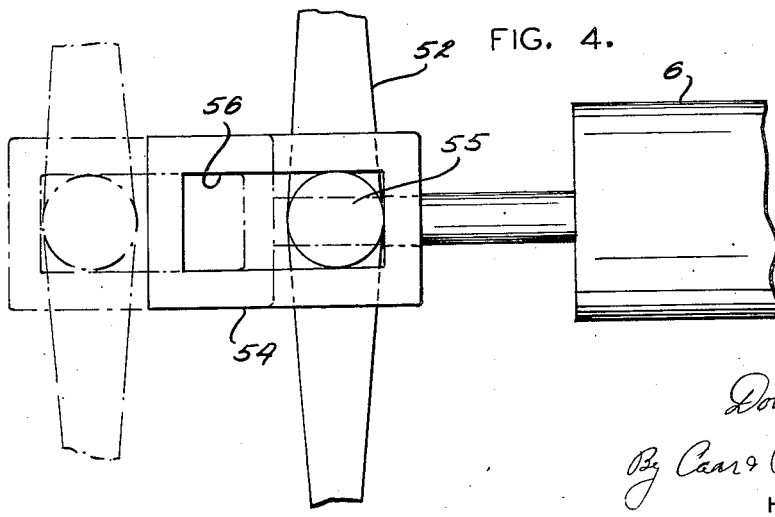
INVENTOR:
Donald W. Irwin,
By Carr & Carr & Gravely,
HIS ATTORNEYS.

United States Patent Office 2,701,695
Patented Feb. 8, 1955

2,701,695

HYDRAULIC INTERLOCK FOR RETRACTABLE LANDING GEAR AND CLOSURE OPERATORS FOR THE CHAMBERS THEREFOR

Donald W. Irwin, Ferguson, Mo., assignor to McDonnell Aircraft Corporation, St. Louis, Mo., a corporation of Maryland Application August 18, 1949, Serial No. 111,038

4 Claims. (Cl. 244—102)

This invention relates to aircraft and is more particularly directed to an improved hydraulic interlock between the fluid motors operating the aircraft landing gear and the fluid motors for operating the closure for the chambers into which the landing gear is retracted.

One of the objects of the invention is to provide an interlocking arrangement between the pressure fluid motors operating the landing gear and the motors operating the closure for the chambers into which the landing gear is retracted so that "back off" of the gear will not occur while the chamber closure is in closed position.

Another object of the invention is to provide an improved check valve for the hydraulic circuits operating the retractible landing gear motor and the closure operating motor for the chamber into which the landing gear is received so that the pressure fluid for the latter circuit and the pressure fluid for the former circuit will be maintained separately but in which the several motor circuits will be interlocked so that undesirable landing gear "back off" will be prevented.

In the drawings:

Fig. 1 illustrates a hydraulic circuit embodying the invention, the illustration showing the landing gear retracted, Fig. 2 is a longitudinal sectional view of a "back off" motion preventing valve, Fig. 3 is a view illustrating the interlock between the landing gear and the landing gear compartment closure, with the landing gear in extended position, Fig. 4 is an enlarged view of the interlock shown in Fig. 3; and Fig. 5 is a longitudinal sectional view of the fluid flow reversing valve included in the system of Fig. 1;

Fig. 6 is a longitudinal sectional view of the flow restrictor valve in the system of Fig. 1; and Fig. 7 is a longitudinal sectional view of a typical down lock valve included in the system of Fig. 1.

The invention is embodied in a circuit lilustrated in Fig. 1 in which the numeral 1 designates a conduit leading from a source of pressure fluid and is connected to one side of a selector valve 2. The selector valve 2 has three conduits 3, 4 and 5 connected thereto, which valve may be adjusted to any one of two positions, as will be hereinafter more specifically set forth.

The conduit 3 leads to a fluid flow reversing control valve 6 for motor 7 that operates closure 8 for the chamber into which retractible landing gear is received, the closure being only schematically illustrated. Conduits 9 and 10 are connected between valve 6 and motor 7 at opposite ends thereof in order that the motor may be reversely operated. A conduit 11 is connected between conduit 3 and one end of one landing gear motor 12 that is operatively connected to landing gear 13, schematically illustrated in the retracted position. The gear 13 is pivoted to the aircraft by suitable trunnions 13a. Conduit 11 is also connected, by means of a branch conduit 14, to one end of a second landing gear motor 12 that is operatively connected to another landing gear 13. The landing gear 13 is suitably pivotally mounted in the aircraft on trunnions 13a (Fig. 3).

The valve 6 (Fig. 5) consists in a housing having ports to connect with the respective conduits 3, 15, 9 and 10. One end of the housing is formed to receive the projecting rod for the head 54 (later to be described) and the other end portion is vented to atmosphere. A valve piston slides in the housing, and the body thereof is formed with three spaced circumferential grooves arranged to open communication between conduits 3 and 10, and 9 and 15 when selector valve 2 is moved to the position of Fig. 1. When the selector valve 2 is moved to landing gear U position, the last action of the interlock on the previous setting is to shift the piston so that conduits 3 and 9 connect through a central axial bore linking two of the circumferential grooves to by-pass the third groove which connects conduits 10 and 15. This is a common type of valve.

A conduit 15 leads from valve 6 and is connected to conduit 4. A conduit 16 is also connected to conduit 4 and to one end of a "back off" preventing check valve 17. A conduit 18 is connected between the other end of valve 17 and conduit 16. Conduits 19 are connected between the other ends of motors 12 and valve 17 with conduit 20 connecting the two conduits 19 to one side of valve 17. A landing gear "down-lock" motor 21 is connected in each conduit 19 along with the reverse flow restricting valve 22. The motors 21 (Fig. 7) each consists in a housing having a tapered valve seat to receive the tapered face of the check valve element. The check valve has a lost-motion connection with the actuating rod head which is in the housing. The lost-motion allows the landing gear to have a small amount of motion into and out of extended position without unlocking motor 12. The valve 22 (Fig. 6) is also of well known type having a spring loaded valve provided with a vent port for one-way flow restriction and in which the valve is movable in the opposite flow direction to open the valve body to maximum flow. The valve 22 is set so that flow from it toward the adjacent down lock valve 21 is restricted, while the reverse flow is unrestricted. The "down-lock" motors positively hold the landing gear in operative position so they will not fold while supporting a load. A conduit 23 is connected between conduit 3 and the other side of valve 17, thereby completing the hydraulic circuit.

The "back off" valve 17 comprises, as shown in Fig. 2, a casing 24 having bores 25 and 26 therein. An open end cylinder 27 is threaded into bore 26, its closed end being provided with a duct 28 that establishes communication between bore 26 and bore 29 in the closed end of the cylinder in which fitting 30 is threaded, conduit 16 being connected to fitting 30. A piston 31 is reciprocably mounted in cylinder 27, its rod 32 extending through wall 33 arranged between bores 25 and 26. A sealing ring 34 is provided on the piston for preventing pressure fluid leakage, and a pressure sealing ring 35 is inserted in an internal groove in the bore of wall 33 for preventing leakage between bores 25 and 26. A pressure sealing ring 36 is positioned in an internal groove in casing 24 and in engagement with the internal surface of cylinder 27.

A fitting 37, to which conduit 23 is connected, is threaded into a bore 38 in casing 24, the bore 38 establishing communication between conduit 23 and the bore 26, the fluid entering or leaving conduit 23 acting on one end of piston 31, the fluid entering or leaving conduit 16 acting on the other end of piston 31.

The end of the casing in which bore 25 is cut is externally threaded and a cap 39 is threaded thereon. A pressure sealing ring 40 is provided in an internal groove in the cap for preventing escape of fluid therefrom. A fitting 41 to which conduit 18 is connected, is threaded into bore 42 in cap 39, thereby establishing communication between conduit 18 and the bore 25. The internal end of cap 39 constitutes a seat for check valve 43 slidably mounted on piston rod 32. The piston rod has a head 44 thereon that slides in bore 46 in check valve 43. A spring 45 is interposed between head 44 and the closed end of bore 46. The check valve 43 has a bored plug 47 threaded into the open end of said bore, the plug being slidable on piston rod 32. The check valve 43 is disengaged from its seat by piston or check valve operating means 31 when head 44 engages plug 47, whereupon pressure fluid in conduit 18 may pass check valve 43 and enter bore 25, or it can enter bore 25 by moving check valve 43 on rod 32 against the loading of spring 45. Communication is established between bore 25 and conduit 20 through fitting 48 threaded into bore 49 formed in casing 24, the conduit 20 being secured to fitting 48.

The motors 12 and valve 6 for motor 7 are mechanically interconnected, as shown in Fig. 3, for shifting the position of valve 6 to provide for proper direction of motion of motor 7, thus opening and closing the chamber closure as required. The motor 7 requires a lower pressure for opening or closing the chamber closure than is required for the operating motors 12 to raise the landing gears 13 into their chamber. The valve 17 takes care of this condition, whereas the interlock preventing the landing gears from entering the chamber until closure 8 is opened, thereby preventing damage to the landing gears or closure.

The interlock described above comprises levers 50 secured to landing gear 13 to which motors 12 are connected. One of the levers 50 (the one at the left in Fig. 3) has one end of a rod 51 connected thereto, the other end of the rod being connected to one end of a lever 52. One end of a second rod 53 is connected to the other end of lever 52, the opposite end of rod 53 being connected to the lever 50 on the right hand landing gear 13.

The valve stem for valve 6 is provided (Fig. 4) with a head 54 connected to closure cycling means lever 52 by a lost motion connection consisting of a pin 55 connected to lever 52 that is received in a slot 56 in head 54. The dotted and solid lines in Fig. 4 show respectively the up and down positions of the landing gear. This structure, however, is well known in the art and herein only generally discloses the interlock between motors 7 and 12.

The selector valve 2 is of the conventional 4-way type well known to the art, and is adjustable to two positions marked "D" and "U," the other two markings being "P," indicating the pressure entering port for the pressure fluid, and "R" indicating the return flow port for spent fluid. Assuming that the landing gear (Fig. 1) is in the "up" position and it is desired to lower them, the selector valve is adjusted, as shown, to accomplish this action, whereupon fluid will flow through conduit 3 to control valve 6. On the previous retraction of gear 13 valve 6 will be adjusted by the interconnection of rods 51 with gears 13 so that fluid will be introduced into the motor 7 through conduit 10 for moving the closure 8 to open position.

As the closure 8 opens, the fluid in conduits 11 and 14, connected to one end of motors 12, will operate motors 12 simultaneously for moving the landing gear into extended or lowered position, and at some point in the extending stroke of the gears 13, the interlock will come into play to reverse the setting of valve 6 to reclose the landing gear chambers. Thus, valve 6 moves so that lines 3 and 9 communicate and lines 10 and 15 communicate to set the motor 7 in reverse operation. Reversing the conduits 3 and 15 with lines 10 and 9 to motor 7 always leaves the valve 6 in condition to control the motor 7 in door opening setting for the next change at the selector valve 2.

While the above is occurring, fluid under pressure from conduit 3 is conducted also through conduit 23 to the valve 17 (Fig. 2) where it enters bore 26 and moves piston 31 to the right, thereby unseating the check valve 43 and placing conduits 19 and 20 in communication with the other end of motors 12. Thus fluid may move out of motors 12 and will eventually flow to conduits 18, 16 and 4 leading to valve 2 and thence to discharge conduit 5. The "down lock" motors 21 will be operated by the exhaust flow of fluid in conduits 19 for the purpose of holding the landing gear 13 in extended, operative position. Valve 22 allows a restricted flow of fluid during the foregoing motion but permits a rapid motion during the reverse direction for retracting the landing gear. Valve 6 is shifted by the mechanical interconnection, thereby shifting the direction of flow through conduits 9 and 10 resulting in the closure motor 7 reversely operating at proper times for securing the desired action.

When it is desired to lift the landing gears 13 into their respective chambers, valve 2 is adjusted to the "U" position for actuating motor 7, now reversed in position to match the opposite flow of pressure fluid to reopen the chambers, and for operating the motors 12 in the direction for lifting the landing gears into their chambers. The conduits 4, 16, 18, 20 and 19 now conduct pressure fluid to the opposite ends of motors 12 and conduits 3, 11, 14 and 23 become discharge conduits connectable to conduit 5 through selector valve 2. Fluid under pressure enters conduit 16 from conduit 4 and enters valve 17 through bore 29 and duct 28 into cylinder 27 for moving piston 31 toward the left, thereby seating check valve 43. Pressure fluid can now only enter valve 17 through conduit 18 and check valve 43 after the pressure is high enough so that it overcomes the resistance of spring 45, and thence through conduits 19 and 20 to motors 12, lifting the landing gears 13 into their respective chambers. At the proper time, that is as the landing gear substantially reaches a fully retracted position, the cycling means or interlock shifts valve 6 to reverse the direction of motor 7 to move closure 8 to closed position. The check valve 43 locks fluid in conduits 19 and 20 and "down lock" motors 21 have been unlocked from the landing gears 13. Reverse flow of fluid from motors 12 is prevented by check valve 43 being normally held in engagement with its seat by spring 45. Any tendency of the landing gear to "back off" from its retracted position after being lifted into their respective chambers, will cause the fluid in conduits 19 and 20 to be placed under pressure, thereby more firmly seating check valve 43. Thus it is apparent that the landing gear will positively be locked in retracted position and will not "back off" to prevent complete closure of the chambers therefor.

What I claim is:

1. An aircraft landing gear control comprising a motor for extending and retracting the landing gear, a source of pressure fluid, a selector valve connecting said source and motor for controlling the direction of operation of said motor, means establishing communication between said selector valve and one side of said motor, means establishing communication between said selector valve and the other side of said motor, a check valve connected in both of said communication means, piston means connected to said check valve for opening said check valve responsive to pressure fluid in one of said communication means to cause fluid to flow therethrough, said piston means connected to said check valve for closing said valve responsive to pressure fluid in the other of said communication means; and means disposed between said check valve and piston means allowing said valve to open after it has been moved to its closed position but preventing flow of pressure fluid from said landing gear motor after it has lifted the landing gear to retracted position for locking the landing gear in position.

2. An aircraft landing gear control comprising a motor for extending and retracting the landing gear, a source of pressure fluid, a selector valve connected between said source and motor for controlling the direction of operation of said motor, conduit means connected between said selector valve and one side of said motor, said conduit means being also connected between said selector valve and the other side of said motor, control means connected in said conduit means for preventing undesired action of said motor, a check valve in said control means, check valve motor means for opening said check valve responsive to pressure fluid in said conduit means to permit fluid flow in a portion of said conduit, resilient means for closing said check valve responsive to the pressure fluid in said portion of said conduit means; and means allowing said check valve to open after it has been moved to its closed position but preventing flow of pressure fluid from said landing gear motor after it has lifted the landing gear to retracted position for locking the latter in position.

3. In a control system for an aircraft landing gear for extending and retracting the landing gear: the combination of a reversible landing gear operating motor; a selector valve connected to said motor to select the direction of motor operation; a source of pressure fluid connected to said selector valve; and control means disposed in the connections between said selector valve and motor comprising a check valve yieldable in one direction under pressure to flow of fluid in the direction to retract the landing gear and effective under reversal of fluid flow to trap pressure fluid in said motor in landing gear retracted position, and check valve operating means connected to said selector valve to respond to pressure fluid upon selector valve operation to extend the landing gear, said operating means displacing said check valve from its fluid trapping position.

4. In an aircraft landing gear system, the combination of landing gear movable between extended and retracted positions, closure means for said landing gear movable between open and closed positions relative to the landing gear, pressure fluid motor means connected to said landing gear to move the latter between its said positions, a source of pressure fluid, fluid connections to said motor means from said source, a selector valve disposed in said fluid connections between said pressure fluid source and said motor means to select the extended and retracted position of said landing gear, second pressure fluid motor means connected to said closure means to move the latter between said positions, other fluid connections between said first mentioned fluid connections and said second motor means, a fluid flow reversing control valve disposed in said other fluid connections to control the direction of movement of said second motor means, and closure cycling means connected between said landing gear and said control valve including link means connected to said landing gear and in lost motion relation to said control valve whereby opening of said closure means is followed by lost motion actuation of said control valve to reverse said second motor means to close said closure means.

References Cited in the file of this patent

UNITED STATES PATENTS

| | | |
|---|---|---|
| 2,001,620 | Levy | May 14, 1935 |
| 2,059,808 | Robart et al. | Nov. 3, 1936 |
| 2,184,057 | Parker | Dec. 19, 1939 |
| 2,200,824 | Herman | May 14, 1940 |
| 2,285,604 | Mercier | June 9, 1942 |
| 2,351,284 | Overbeke | June 13, 1944 |
| 2,420,441 | Paterson | May 13, 1947 |
| 2,452,787 | Patch | Nov. 2, 1948 |
| 2,552,843 | Clifton | May 15, 1951 |

FOREIGN PATENTS

| | | |
|---|---|---|
| 954,083 | France | June 6, 1949 |